US011629666B2

(12) United States Patent
Brandstein et al.

(10) Patent No.: US 11,629,666 B2
(45) Date of Patent: Apr. 18, 2023

(54) TURBOFAN ENGINE

(71) Applicant: ISRAEL AEROSPACE INDUSTRIES LTD., Lod (IL)

(72) Inventors: Aviad Brandstein, Pardes Hana Karkur (IL); Avi Ponchek, Rishon Lezion (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 0 days.

(21) Appl. No.: 17/184,903

(22) Filed: Feb. 25, 2021

(65) Prior Publication Data
US 2021/0270209 A1    Sep. 2, 2021

Related U.S. Application Data

(63) Continuation of application No. 14/915,875, filed as application No. PCT/IL2014/050780 on Aug. 31, 2014, now Pat. No. 11,053,891.

(30) Foreign Application Priority Data

Sep. 3, 2013   (IL) .......................................... 228274

(51) Int. Cl.
*F02K 3/04*    (2006.01)
*F01D 5/02*    (2006.01)
(Continued)

(52) U.S. Cl.
CPC ............... *F02K 3/04* (2013.01); *F01D 5/02* (2013.01); *F01D 9/02* (2013.01); *F01D 15/10* (2013.01);
(Continued)

(58) Field of Classification Search
CPC ...... F02K 3/04; F02K 3/06; F02C 3/04; F02C 3/062; F01D 5/02; F01D 15/10; F05D 2230/80
See application file for complete search history.

(56) References Cited

U.S. PATENT DOCUMENTS 3,262,635 A    7/1966 Smuland
3,494,129 A    2/1970 Krebs et al.
(Continued)

FOREIGN PATENT DOCUMENTS

CN    2127958 Y    3/1993
CN    101881237 A    11/2010
(Continued)

OTHER PUBLICATIONS

International Search Report and Written Opinion from International Application No. PCT/IL2014/050780 dated Dec. 16, 2014.
(Continued)

*Primary Examiner* — Steven M Sutherland
(74) *Attorney, Agent, or Firm* — Dorsey & Whitney LLP (57) ABSTRACT

A method for converting a turbofan engine including providing a turbofan engine and converting the turbofan engine. The turbofan engine includes a core engine (including at least one high pressure spool assembly and a combustion chamber), and an unmodified fan configured for providing at least a bypass flow bypassing the core engine, the fan being mechanically coupled to a low pressure turbine that is in turn driven by the core engine. The conversion includes modifying or replacing the unmodified fan to provide a modified fan, the modified fan configured for generating a reduced bypass flow with respect to said fan bypass flow during operation of the converted turbofan engine corresponding to at least one set of engine conditions, enabling said low pressure turbine to generate an excess shaft power above a baseline shaft power required for driving the modified fan during operation of the converted turbofan engine.

14 Claims, 8 Drawing Sheets

(51) Int. Cl.
  F01D 9/02 (2006.01)
  F01D 15/10 (2006.01)
  F02C 3/04 (2006.01)
  F02K 3/06 (2006.01)

(52) U.S. Cl.
  CPC ............... F02C 3/04 (2013.01); F02K 3/06 (2013.01); *F05D 2220/36* (2013.01); *F05D 2230/80* (2013.01); *F05D 2240/35* (2013.01); *F05D 2240/60* (2013.01)

(56) References Cited

U.S. PATENT DOCUMENTS

| | | | |
|---|---|---|---|
| 3,946,554 | A | 3/1976 | Neumann |
| 3,994,128 | A | 11/1976 | Griswold et al. |
| 4,062,185 | A * | 12/1977 | Snow ............... F02N 7/12 60/242 |
| 4,767,270 | A | 8/1988 | Seidel |
| 4,791,783 | A | 12/1988 | Neitzel |
| 5,310,318 | A | 5/1994 | Lammas et al. |
| 5,419,112 | A | 5/1995 | Farrell |
| 5,485,717 | A | 1/1996 | Williams |
| 6,378,293 | B1 | 4/2002 | Care et al. |
| 6,413,051 | B1 | 7/2002 | Chou et al. |
| 6,895,325 | B1 | 5/2005 | Munson |
| 7,036,318 | B1 | 5/2006 | Munson |
| 7,424,360 | B1 | 9/2008 | Munson |
| 7,461,510 | B1 | 12/2008 | Munson |
| 7,622,817 | B2 | 11/2009 | El-refaie et al. |
| 7,805,947 | B2 | 10/2010 | Moulebhar |
| 7,900,433 | B2 | 3/2011 | Mccall |
| 8,104,265 | B2 | 1/2012 | Kupratis |
| 8,198,744 | B2 | 6/2012 | Kern et al. |
| 2009/0285686 | A1 | 11/2009 | Violette et al. |
| 2009/0289456 | A1 * | 11/2009 | McLoughlin ............ F02C 7/36 290/46 |
| 2010/0000226 | A1 | 1/2010 | Rensch |

FOREIGN PATENT DOCUMENTS

| | | | |
|---|---|---|---|
| EP | 1031715 | A2 * | 8/2000 ............ F01D 15/10 |
| EP | 2270326 | A2 | 1/2011 |
| GB | 2251657 | A | 7/1992 |
| RU | 2179646 | C2 | 2/2002 |
| RU | 2499152 | C1 | 11/2013 |
| SU | 1726812 | A1 | 4/1992 |
| WO | 2010042215 | A1 | 4/2010 |

OTHER PUBLICATIONS

Extended European Search Report for European Patent Application No. 14842019.3 dated Mar. 22, 2017, 3 pages.
"CFM56-3 Modular Design", The Power of Flight, http://www.f-16.net/attachments/cfm56-3.gif, available at least as of Nov. 8, 2013, 1 page.
"General Electric TF39", Wayback Machine, http://en.Wikipedia.org/wiki/General_Electric_TF39, Sep. 16, 2010, 3.
"LM2500 Marine Gas Turbine", General Electric, Sep. 11, 2006, pp. 2.
"Turbo Fan Engine", National Aeronautics and Space Administration, http://www.grc.nasa.gov/WWW/k-12/airplane/atrubf.html, available at least as of Nov. 8, 2013, 3 pages.
Eliseev, et al., "Theory and Design of Gas-Turbine and Combined Installations", English Translation, 2000, pp. 600-603.
Walsh, et al., "Chapter 6: Design Point Performance and Engine Concept Design", Gas Turbine Performance, Jan. 1, 1998, pp. 293-382.

* cited by examiner

TURBOFAN ENGINE

TECHNOLOGICAL FIELD

The presently disclosed subject matter relates to aeroderivative gas turbine engines, particularly for the generation of electrical power.

BACKGROUND

Gas turbines have been used for many years for the generation of electrical power. Such gas turbines, often referred to as land-based gas turbines, can be divided into two general groups: industrial engines and aeroderivative engines.

Industrial engines are purpose-built for electrical generation or other land-based uses, while aeroderivative engines are derived from aeronautical gas turbine engines that are originally designed for aeronautical applications such as propulsion units for aircraft, for example. While industrial engines tend to be physically large and heavy, aeroderivative engines are generally far more compact.

Some types of aeroderivative engines are provided from gas turbine engines that have been previously used for aeronautical applications. In such cases, the gas turbine engines are refurbished, and converted for electrical power generation.

The conventional approach for converting a turbojet type gas turbine to provide an aeroderivative gas turbine is to replace the exhaust nozzle with an aerodynamically coupled power turbine, which generates shaft power which in turn can be used to drive an electrical power generator, such as an alternator for example, to generate electrical power.

The conventional approach for converting a turboprop type gas turbine to provide an aeroderivative gas turbine for electrical power generation, for example, is to remove the propeller and gearbox from the power turbine, and to mechanically couple the power turbine of the turboprop to an electrical power generator.

The conventional approach for converting a turbofan type gas turbine to provide an aeroderivative gas turbine is to convert the turbofan engine to a turbojet engine, by replacing the fan and bypass system with an additional low pressure ratio compressor, and by replacing the exhaust nozzle with an aerodynamically coupled power turbine, which generates shaft power which in turn can be used to drive an electrical power generator.

GENERAL DESCRIPTION

According to an aspect of the presently disclosed subject matter, there is provided a method for converting a turbofan engine, comprising;
(a) providing a turbofan engine, the turbofan engine comprising;
   a core engine including at least one high pressure spool assembly and a combustion chamber;
   an unmodified fan configured for providing at least a bypass flow bypassing the core engine at least at one set of engine conditions, the fan being mechanically coupled to a low pressure turbine that is in turn driven by the core engine;
(b) providing a converted turbofan engine from the turbofan engine by modifying or replacing the unmodified fan to provide a modified fan, the modified fan being configured for generating a reduced bypass flow with respect to said fan bypass flow during operation of the converted turbofan engine corresponding to said at least one set of engine conditions of step (a), thereby enabling said low pressure turbine to generate an excess shaft power above a baseline shaft power required for driving said modified fan during operation of the converted turbofan engine.

Thus, in operation of the converted turbofan engine said low pressure turbine generates the aforesaid excess shaft power, wherein the excess shaft power is in excess of the baseline shaft power that is required for driving said modified fan during operation of the converted turbofan engine. The excess shaft power can be used for a variety of uses, for example generation of electrical power.

For example, in step (b) said modified fan is modified with respect to the unmodified fan by reducing the outer diameter of the fan blades of said unmodified fan. Additionally or alternatively, in step (b), said modified fan is modified with respect to the unmodified fan by removing at least an outer radial portion of the fan blades of said unmodified fan. Additionally or alternatively, in step (b), said modified fan is modified with respect to the unmodified fan by removing the fan blades of said unmodified fan.

Alternatively, for example, in step (b), said modified fan is modified with respect to the unmodified fan by modifying the geometry of at least an outer radial portion of the fan blades of said unmodified fan such that the said at least outer radial portion of the fan blades generates reduced bypass flow as compared with the unmodified fan blades. Optionally, said at least outer radial portion of the fan blades is modified by providing a zero or near zero angle of attack with respect to a direction of an airflow into the converted turbofan engine.

Additionally or alternatively, in step (a), the unmodified fan is also configured for providing a core flow through the core engine. Optionally, said unmodified fan is further configured for providing a first pressure ratio to a core flow to the core engine, and wherein said modifying or replacing the unmodified fan to provide a modified fan is such as to provide instead a second pressure ratio to the core flow to the core engine replacing said first pressure ratio, wherein said first pressure ratio is similar in magnitude to said second pressure ratio. Alternatively, said unmodified fan is further configured for providing a first pressure ratio to a core flow to the core engine, and wherein said modifying or replacing the unmodified fan to provide a modified fan is such as to provide instead a second pressure ratio to the core flow to the core engine replacing said first pressure ratio, wherein said first pressure ratio is smaller in magnitude to said second pressure ratio. Alternatively, said unmodified fan is further configured for providing a first pressure ratio to a core flow to the core engine, and wherein said modifying or replacing the unmodified fan to provide a modified fan is such as to provide instead a second pressure ratio to the core flow to the core engine replacing said first pressure ratio, wherein said first pressure ratio is larger in magnitude to said second pressure ratio. Alternatively, said unmodified fan is further configured for providing a first pressure ratio to a core flow to the core engine, and wherein said modifying or replacing the unmodified fan to provide a modified fan is such as to provide instead a second pressure ratio to the core flow to the core engine, wherein said second pressure ratio is 1.0.

Additionally or alternatively, in step (b), said modified fan is configured to produce a reduced bypass thrust, as compared with the bypass thrust generated the unmodified fan.

For example, additionally or alternatively to the above, said modified fan and said low pressure turbine are provided in a low pressure spool assembly.

For example, additionally or alternatively to the above, the method further comprises operatively coupling the converted turbofan engine to an electrical generator to enable conversion of said excess shaft power to electrical power. Additionally or alternatively, the method further comprises operatively coupling the converted turbofan engine to a mechanical load to apply said excess shaft power to the mechanical load For example, additionally or alternatively to the above, said turbofan engine in step (a) is a multi-spool, high bypass, forward fan, turbofan gas turbine engine, wherein said unmodified fan is forward mounted. For example, the converted turbofan engine is selectively coupled to the electrical generator via the modified fan; optionally, the converted turbofan engine is further selectively coupled to an additional electrical generator via the low pressure turbine. For example, the converted turbofan engine is coupled to the electrical generator via the low pressure turbine.

For example, additionally or alternatively to the above, said turbofan engine in step (a) is a multi-spool, high bypass, aft fan, turbofan gas turbine engine, wherein said unmodified fan is aft-mounted. For example, in step (a), the unmodified fan is configured for providing only a bypass airflow, i.e., no core flow is provided by the unmodified fan. Additionally or alternatively, said modified fan and said low pressure turbine are provided in a single rotor assembly. Additionally or alternatively, the converted turbofan engine is coupled to the electrical generator via the low pressure turbine. Additionally or alternatively, said reduced bypass thrust is nominally zero.

Additionally or alternatively, the method further comprises providing a thrust bearing arrangement for the low pressure turbine for balancing a next axial force corresponding to said excess shaft power.

Additionally or alternatively, the method further comprises maintaining the engine pressure ratio of the turbofan engine in the modified turbofan engine. For example, maintaining the engine pressure ratio of the turbofan engine in the modified turbofan engine comprises modifying the low pressure turbine in the modified turbofan engine to provide a flow cross-sectional flow area through the low pressure turbine at an axial location thereof that is larger than the corresponding flow cross-sectional flow area in the turbofan engine.

Additionally or alternatively, the method further comprises replacing a core nozzle of the unmodified engine of step (a) with an exhaust diffuser to the core engine in step (b), wherein the exhaust diffuser is configured for reducing a core engine thrust as compared to a core thrust of the core engine in the unmodified turbofan engine.

For example, additionally or alternatively to the above, said at least at one set of engine conditions includes at least one of the design point of the turbofan engine and the maximum continuous cruise at ISA conditions of the turbofan engine.

According to an aspect of the presently disclosed subject matter, there is also provided a turbofan engine, comprising:
a core engine including at least one high pressure spool assembly and a combustion chamber;
a modified fan mechanically coupled to a low pressure turbine that is in turn driven by hot gases generated by the core engine;
wherein said modified fan is derived from or replaces an unmodified fan;
wherein said low pressure turbine is initially designed to drive the unmodified fan, when coupled thereto in place of the modified fan, the unmodified fan being configured for providing at least a bypass flow bypassing the core engine at least at one set of engine conditions when driven by said low pressure turbine;
wherein said modified fan is configured for generating a reduced bypass flow with respect to said fan bypass flow during operation of the turbofan engine corresponding to said at least one set of engine conditions, and for concurrently allowing said low pressure turbine to generate an excess shaft power above a baseline power required for driving said modified fan during operation of the turbofan engine at least at said at least one set of engine conditions.

For example, said turbofan engine is produced by converting an unmodified turbofan engine, the unmodified turbofan engine comprising said core engine and said unmodified fan, said unmodified fan being mechanically coupled to the low pressure turbine that is in turn driven by hot gases generated by the core engine, and wherein said conversion includes modifying or replacing the unmodified fan to provide the modified fan.

For example, said modified fan is configured to produce a reduced bypass thrust, as compared with the bypass thrust generated by the unmodified fan when coupled to the turbofan engine in place of the modified fan.

For example, said modified fan is modified with respect to the unmodified fan by reducing the outer diameter of the fan blades of said unmodified fan. Optionally, said modified fan is modified with respect to the unmodified fan by removing at least an outer radial portion of the fan blades of said unmodified fan. Additionally or alternatively, said modified fan is modified with respect to the unmodified fan by removing the fan blades of said unmodified fan.

Alternatively, said modified fan is modified with respect to the unmodified fan by modifying the geometry of at least an outer radial portion of the fan blades of said unmodified fan such that the said at least outer radial portion of the fan blades generates reduced bypass flow as compared with the unmodified fan blades. For example, said at least outer radial portion of the fan blades is modified by providing a zero or near zero angle of attack with respect to a direction of an airflow into the turbofan engine.

For example, additionally or alternatively to the above, the unmodified fan is further configured for providing a core flow through the core engine. Optionally, said unmodified fan is further configured for providing a first pressure ratio to a core flow to the core engine, and wherein said modifying or replacing the unmodified fan to provide a modified fan is such as to provide instead a second pressure ratio to the core flow to the core engine replacing said first pressure ratio, wherein said first pressure ratio is similar in magnitude to said second pressure ratio. Alternatively, said unmodified fan is further configured for providing a first pressure ratio to a core flow to the core engine, and wherein said modifying or replacing the unmodified fan to provide a modified fan is such as to provide instead a second pressure ratio to the core flow to the core engine replacing said first pressure ratio, wherein said first pressure ratio is smaller in magnitude to said second pressure ratio. Alternatively, said unmodified fan is further configured for providing a first pressure ratio to a core flow to the core engine, and wherein said modifying or replacing the unmodified fan to provide a modified fan is such as to provide instead a second pressure ratio to the core flow to the core engine replacing said first pressure ratio, wherein said first pressure ratio is greater in magnitude to said second pressure ratio. Alternatively, said unmodified fan is further configured for providing a first pressure ratio to a core flow to the core engine, and wherein said modifying or replacing the unmodified fan to provide a modified fan is such as to provide instead a second pressure ratio to the core flow to the core engine replacing said first pressure ratio, wherein said second pressure ratio is 1.0.

For example, said modified fan and said low pressure turbine are provided in a low pressure spool assembly.

For example, additionally or alternatively to the above, the turbofan engine is configured for being operatively coupled to an electrical generator to enable conversion of said excess shaft power to electrical power. Additionally or alternatively, the turbofan engine is configured for being operatively coupling the converted turbofan engine to a mechanical load to apply said excess shaft power to the mechanical load For example, additionally or alternatively to the above, said turbofan engine is a multi-spool, high bypass, forward fan, turbofan gas turbine engine, wherein the unmodified fan is forward mounted. For example, the turbofan engine is selectively coupled to the electrical generator via the modified fan. Optionally, the turbofan engine is further selectively coupled to an additional electrical generator via the low pressure turbine. Alternatively, the turbofan engine is selectively coupled to the electrical generator via the low pressure turbine.

For example, additionally or alternatively to the above, said turbofan engine is a multi-spool, high bypass, aft fan, turbofan gas turbine engine, wherein the unmodified fan is aft-mounted. For example, the unmodified fan is configured for providing only a bypass airflow, i.e., does not provide a core flow to the core engine. For example, said modified fan and said low pressure turbine are provided in a single rotor assembly. For example, the turbofan engine is selectively coupled to the electrical generator via the low pressure turbine.

For example, said reduced bypass thrust is nominally zero.

Additionally or alternatively, the turbofan engine further comprises a thrust bearing arrangement for the low pressure turbine for balancing a next axial force corresponding to said excess shaft power.

Additionally or alternatively, the turbofan engine maintains the engine pressure ratio of the unmodified turbofan engine in the turbofan engine. For example, the low pressure turbine in the turbofan engine is modified with respect to the respective low pressure turbine in the unmodified turbofan engine to provide a flow cross-sectional flow area through the low pressure turbine of the turbofan at an axial location thereof that is larger than the corresponding flow cross-sectional flow area in the unmodified turbofan engine.

Additionally or alternatively, the turbofan engine, further comprises an exhaust diffuser fitted to the core engine, wherein the exhaust diffuser is configured for reducing a core engine thrust as compared to a core thrust of the core engine in the unmodified turbofan engine.

Additionally or alternatively, said at least at one set of engine conditions includes the design point of the turbofan engine.

Additionally or alternatively, said at least at one set of engine conditions includes wherein said at least at one set of engine conditions includes maximum continuous cruise at ISA conditions of the turbofan engine.

The method and converted turbofan engine according to at least one example of the presently disclosed subject matter provides at least one of the following features as compared with the conventional approach for converting a turbofan type gas turbine to provide an aeroderivative gas turbine:

overall development time can be significantly reduced, and/or less testing of the respective aeroderivative engine may be required as compared with the conventional approach;

the respective aeroderivative engine requires relatively few changes to the original engine hardware (i.e., the unmodified turbofan engine) as compared with the conventional approach;

less new parts need to be provided for the conversion and for production of the respective aeroderivative engine as compared with the conventional approach.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
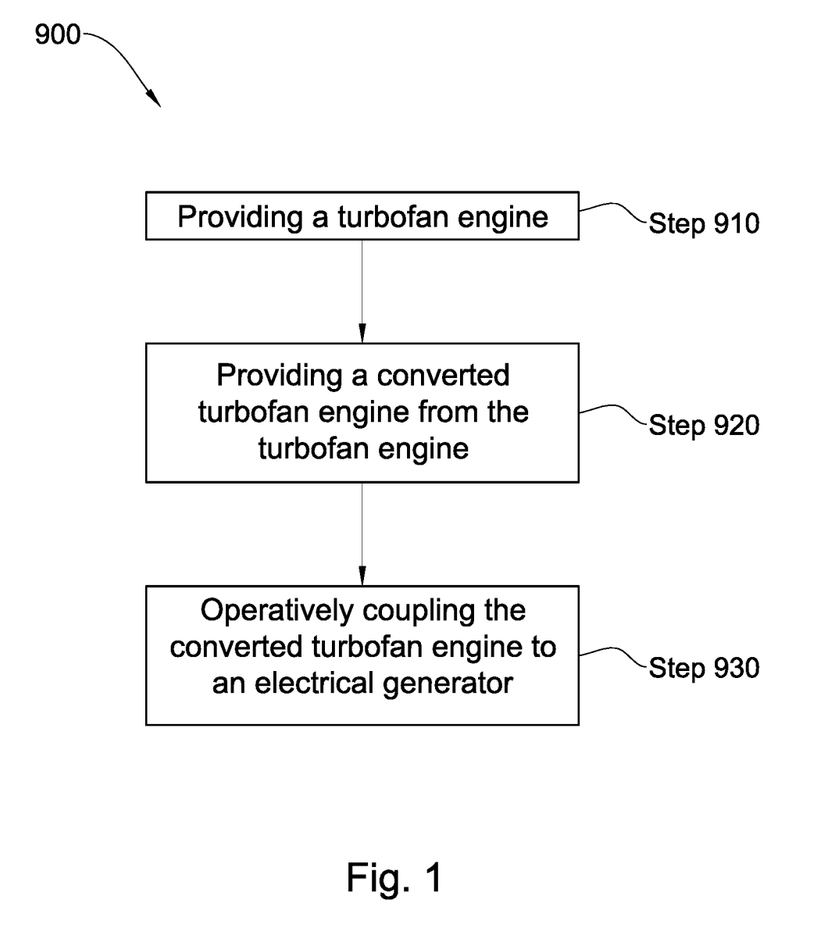
FIG. 1 schematically illustrates various steps in the method of converting a turbofan gas turbine engine to an aeroderivative engine for generation of electrical power, according to at least some examples of the presently disclosed subject matter.

Referring to FIG. 1, a first example of a method for converting a turbofan engine into an aeroderivative for the generation of electricity (the method being generally designated with the reference numeral 900) comprises the following steps:

Step 910~providing a turbofan engine.

Step 920~providing a converted turbofan engine from the turbofan engine.

Step 930~operatively coupling the converted turbofan engine to an electrical generator.

Herein, the term "modified turbofan engine" is used interchangeably with "aeroderivative engine", "converted turbofan engine", and the like.

As will become clearer below, the turbofan engine of Step 910 comprises at least the following components:

- a core engine including at least one high pressure spool assembly and a combustion chamber;
- an unmodified fan configured for providing at least a bypass flow bypassing the core engine, the fan being connected to a low pressure turbine that is in turn driven by the core engine.

Figure 2:
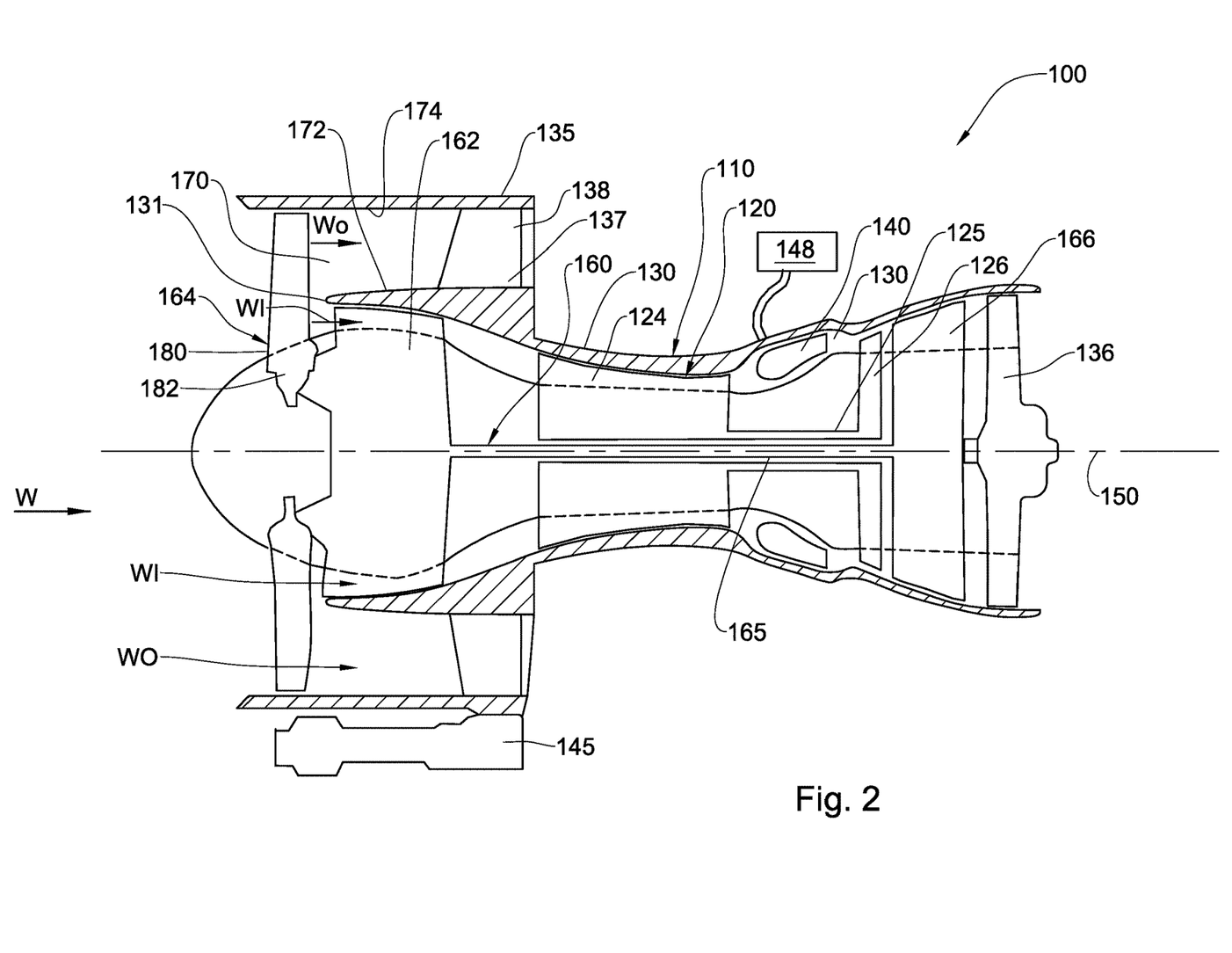
FIG. 2 schematically illustrates, in cross-sectional side view, a first example of an unmodified turbofan gas turbine engine.

Referring also to FIG. 2, a first example of a turbofan engine, generally designated with reference numeral 100, provided in Step 910, is a multi-spool, high bypass, forward fan, turbofan gas turbine engine.

In this example, the turbofan engine 100 is an aeronautical gas turbine engine, for example a CFM56 turbofan engine, built by CFM International, which is a joint venture between GE Aviation, a division of General Electric (USA) and Snecma, a division of Safran (France). However, in alternative variations of this example, or in other alternative examples, the turbofan engine provided in Step 910 can be any suitable turbofan engine, mutatis mutandis, for example other members of CFM 56 family of turbofan engines, or other suitable turbofans.

Turbofan engine 100 comprises a core engine 110, including casing 130, a high pressure spool assembly 120, and combustion chamber 140. The high pressure spool assembly 120 is rotatable about longitudinal axis 150, and comprises a high pressure compressor 124 and a high pressure turbine 126, axially spaced from one another by an outer shaft 125.

The combustion chamber 140 is disposed between the high pressure compressor 124 and the high pressure turbine 126. The combustion chamber 140 is, in this example an annular combustion chamber, and is operatively connected to a fuel system 148.

Turbofan engine 100 also comprises a fan 164 mechanically coupled to a low pressure turbine 166 for rotation therewith. In this example, the fan 164 is located at a forward portion of the turbofan engine 100, forward of the core engine 110, and this mechanical coupling is via inner shaft 165. Inner shaft 165 is in coaxial relationship with outer shaft 125 and turns independently thereof about longitudinal axis 150. Thus, in this example, a low pressure spool assembly 160 includes fan 164, low pressure turbine 166 and inner shaft 165.

Further in this example, the low pressure spool assembly 160 also comprises a low pressure compressor 162, downstream of fan 164 and accommodated in the casing 130.

In alternative variations of this example, the core engine 110 can comprise additional spool assemblies. For example an intermediate pressure spool assembly can be provided, intermediate between the low pressure spool assembly 160 and the high pressure spool assembly 120.

An annular bypass duct 170 is provided, having an inner wall 172 defined by an outer part of a forward portion of the casing 130, and having an outer wall 174 defined by an inner part of bypass casing 135. Bypass casing 135 is in radially spaced relationship with respect to casing 130 via radial struts 138.

The low pressure spool assembly 160 and the high pressure spool assembly 120 are directly or indirectly rotatably mounted to a forward support in the form of fan frame 137 and aft support in the form of turbine frame 136, via suitable bearings.

Fan 164 is accommodated in the bypass casing 135, forward of the casing 130. Fan 164 comprises a plurality of fan blades 180 radially projecting from fan disc 182.

Accessory drive section 145 can be provided on the outside of the bypass casing 135. Accessory drive section 145 can include one or more of the following, for example: a starter/generator; accessory gearbox; transfer gearbox; horizontal driveshaft; radial driveshaft; inlet gearbox.

In conventional operation of the turbofan engine 100, the fan induces a flow W of air into the turbofan engine 100, and this flow is split at the leading edge 131 of casing 130 into an inner airflow WI that is channeled to the core engine 110, and a bypass airflow WO that is channeled to the bypass duct 170.

In this example, the bypass ratio, defined as the mass flow rate ratio between the bypass airflow WO and inner airflow WI, is 5:1, or in the order of 5:1, for example 4.75:1. However, in the above or other alternative variations of this example, or in the above or other alternative examples, the respective bypass ratio can be less than 5:1 or greater than 5:1.

The inner airflow WI is compressed by the low pressure compressor 162 and the high pressure compressor 124, and fed to the combustion chamber 140, wherein fuel, provided by the fuel system 148, is also fed and burnt, generating hot exhaust gases. These exhaust gasses pass through and drive the high pressure turbine 126 and then the low pressure turbine 166. In aeronautical applications, a nozzle (not shown) is provided aft of the low pressure turbine 166 and casing 130, for accelerating the hot exhaust gases and providing a core thrust.

The bypass airflow WO flows through the bypass duct 170, bypassing the core engine 110, and providing in aeronautical applications a fan bypass thrust.

Thus, the core engine 110 is designed to generate hot exhaust gases capable of driving the high pressure turbine 126, the low pressure turbine 166, and having sufficient energy to provide the required core thrust. In turn, the high pressure turbine 126 is designed to generate sufficient power to drive the high pressure compressor 124, while the low pressure turbine 166 is designed to generate sufficient power to drive the low pressure compressor 162 and fan 164, and thus to provide the required fan bypass thrust.

As will become clearer below, Step 920 comprises providing a converted turbofan engine from the (unmodified) turbofan engine 100, by modifying or replacing the original unmodified fan to provide a modified fan that is now configured for reducing bypass fan airflow generated by the fan during operation of the engine (as compared with the bypass fan airflow generated with the unmodified fan in the original turbofan engine), to allow the low pressure turbine to generate an excess shaft power above a baseline shaft power that is required for driving said modified fan during operation of the converted turbofan engine.

Figure 3:
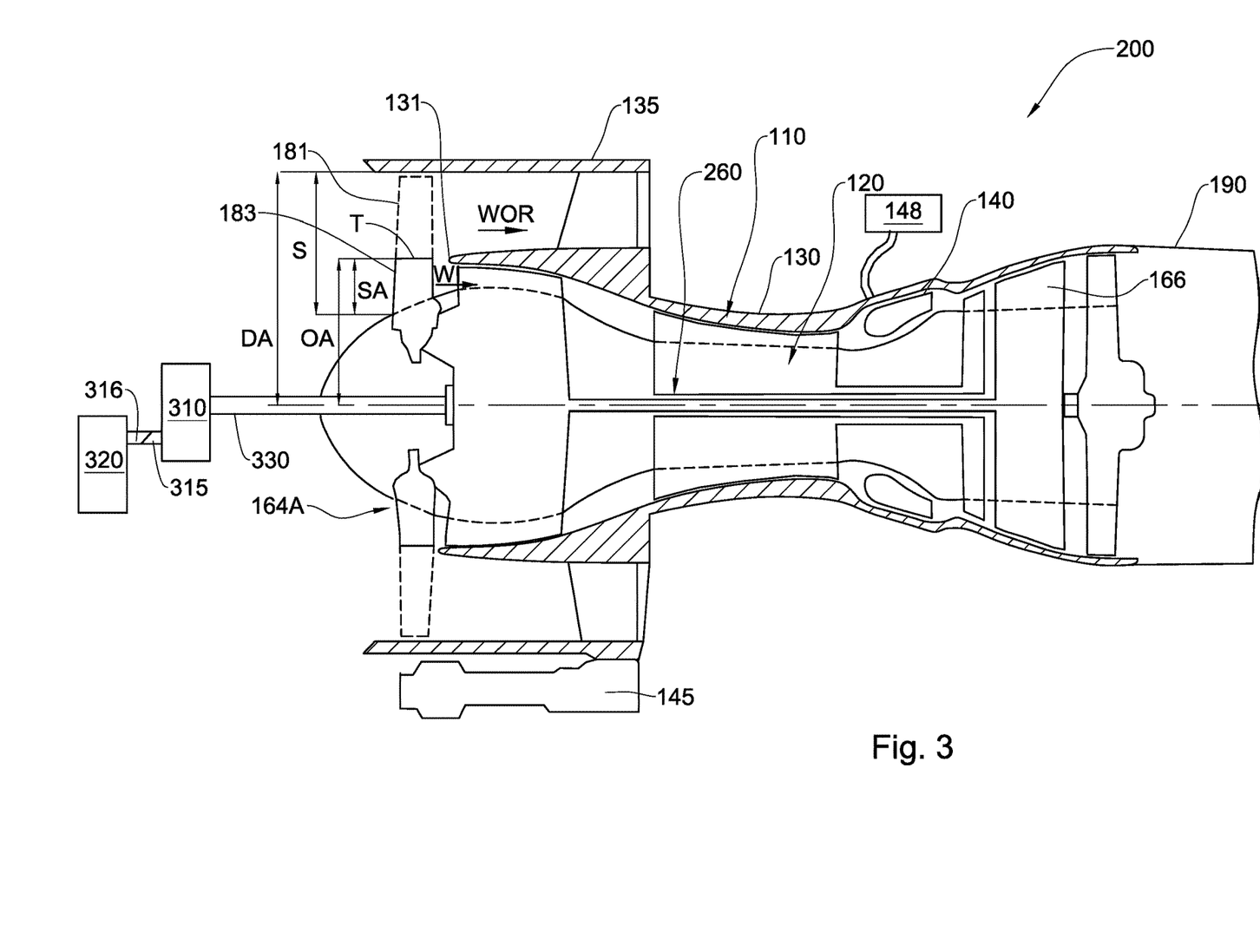
FIG. 3 schematically illustrates, in cross-sectional side view, a first example of a modified turbofan gas turbine engine, converted from the unmodified turbofan gas turbine engine example of FIG. 2, based on a first example of a modified fan.

Referring also to FIG. 3, the turbofan engine 100 is converted to a modified or converted turbofan 200, comprising, i.e., retaining, the core engine 110, including the high pressure spool assembly 120 and the combustion chamber 140, and also comprising, i.e., retaining, the low pressure turbine 166. As is clear from the presently disclosed subject matter, the low pressure turbine 166 is initially designed to drive the unmodified fan 164, the unmodified fan 164 being configured for providing at least a bypass airflow bypassing the core engine to generate a fan bypass thrust when driven by said low pressure turbine. (In this example the unmodified fan 164 is also configured for providing, a core airflow through the core engine 110 for operation thereof.) However, in the converted or modified turbofan engine, the original or unmodified fan 164 is modified to provide, or alternatively is replaced by, a modified fan, which is coupled to the low pressure turbine 166 via the correspondingly modified low pressure spool assembly 260, in a similar manner to the coupling of the unmodified fan 164 to the low pressure turbine 166 via the unmodified low pressure spool assembly 160 as disclosed herein, mutatis mutandis. Similarly, in the modified turbofan engine 200, the low pressure turbine 166 is driven by hot gases generated by the core engine 110, thereby turning the modified fan.

The modified fan is configured for generating a reduced bypass airflow (typically accompanied by a reduced fan thrust) during operation of the modified bypass engine 200, as compared with the bypass fan airflow (and bypass thrust, respectively), generated by the unmodified fan (at similar engine operating conditions). Thereby, the low pressure turbine 166 generates an excess shaft power above a baseline shaft power that is required only for driving said modified fan during operation of the converted turbofan engine. The greater the reduction in the bypass airflow WO (and thus typically of bypass fan thrust), the greater is the excess shaft power generated by the low pressure turbine 166, and this excess shaft power can be maximized by reducing the bypass fan thrust or bypass airflow to zero, or near thereto.

In other words, by removing or substantially reducing the requirement for the modified fan to generate bypass airflow, the shaft power that was formerly required for driving the unmodified fan to generate such a bypass airflow (and typically bypass fan thrust) in the original turbofan engine 100 now becomes available shaft power, and thus for conversion subsequently to electrical power.

The modified fan is thus configured to provide a significantly reduced bypass airflow WOR, up to a zero bypass airflow, as compared to the bypass airflow WO generated by the unmodified turbofan engine 100 with the unmodified fan 164, at similar operating conditions (i.e., at similar engine conditions).

In practice it can be beneficial to retain a small proportion of the bypass mass flow, to improve the aerodynamic quality of the flow entering into the core engine and/or this minimal bypass flow can provide cooling benefits to the core engine. An optimal condition can be found in which engine performance of the core engine can be maximized on the one hand and the bypass flow minimized on the other hand.

Concurrently, the unmodified fan 164 is configured for providing a first pressure ratio to a core flow that flows to the core engine; modifying or replacing the unmodified fan to provide the modified fan is such as to provide instead a second pressure ratio to the core flow that flows to the core engine (thereby replacing the first pressure ratio), wherein the first pressure ratio is similar in magnitude to the second pressure ratio. However, it is possible for the first pressure ratio to be larger in magnitude to the second pressure ratio, i.e., modifying or replacing the unmodified fan to provide a modified fan can result in the second pressure ratio to be smaller than the first pressure ratio. On the other hand, it is also possible to provide a second pressure ratio that is in fact larger than the first pressure ratio, for example by increasing the rpm of the low pressure spool.

Referring again to FIG. 3, in a first example of the modified fan, designated herein by the reference numeral 164A, the modified fan 164A comprises modified fan blades 180A, having root to tip spans SA that are significantly shorter than the respective spans S of the unmodified fan blades 180 of the unmodified turbofan engine 100. In this example, the original fan blades 180 are worked on to mechanically remove a radially outer portion 181 of each of the fan blades 180, so that only a radially inner portion 183 of the fan blades 180 remain in the modified fan blades 180A. Thus, the outer diameter DA of modified fan 164A is significantly smaller than the corresponding outer diameter D of the unmodified fan 164. Optionally, the modified fan 164A can be further modified by providing an annular shroud (not shown) connecting the tips T of the modified fan blades 180A.

Alternatively rather than modifying the existing fan blades 180, these can be removed and replaced with new modified fan blades 180A, or the whole fan 180 can be replaced with a new fan having modified fan blades 180A with reduced diameter viz-a-viz the unmodified fan blades. In this example, the tips T of the modified fan blades 180A extend radially to the radial position of the leading edge 131 of casing 130, or just beyond—for example, the radial position of the edge 131 can be optimized to provide optimized performance for the modified engine in which engine performance of the core engine can be maximized on the one hand and the bypass flow minimized on the other hand, thereby providing a small bypass flow which can be beneficial, as mentioned above. By doing so, the core airflow WI can remain relatively unaffected by the above modification of the fan, thereby ensuring that the compression pressure ratio of the core airflow into the core engine 110 remains essentially the same as in the unmodified turbofan engine 100 (for the same set of operating (engine) conditions). In alternative variations of this example, the tips T of the modified fan blades 180A do not extend radially to the radial position of the leading edge 131 of casing 130, but instead are located at a radial position inwards of that of the leading edge 131.

In at least this example (and optionally also for the second and third examples below and alternative variations thereof, mutatis mutandis), the bypass casing 135 is retained, and the accessories 145 can also be retained, to minimize additional modifications to the modified turbofan engine 200. However, in alternative variations of these examples and in other examples, it is also possible to remove the bypass casing 135 and/or the accessories 145.

Figure 4:
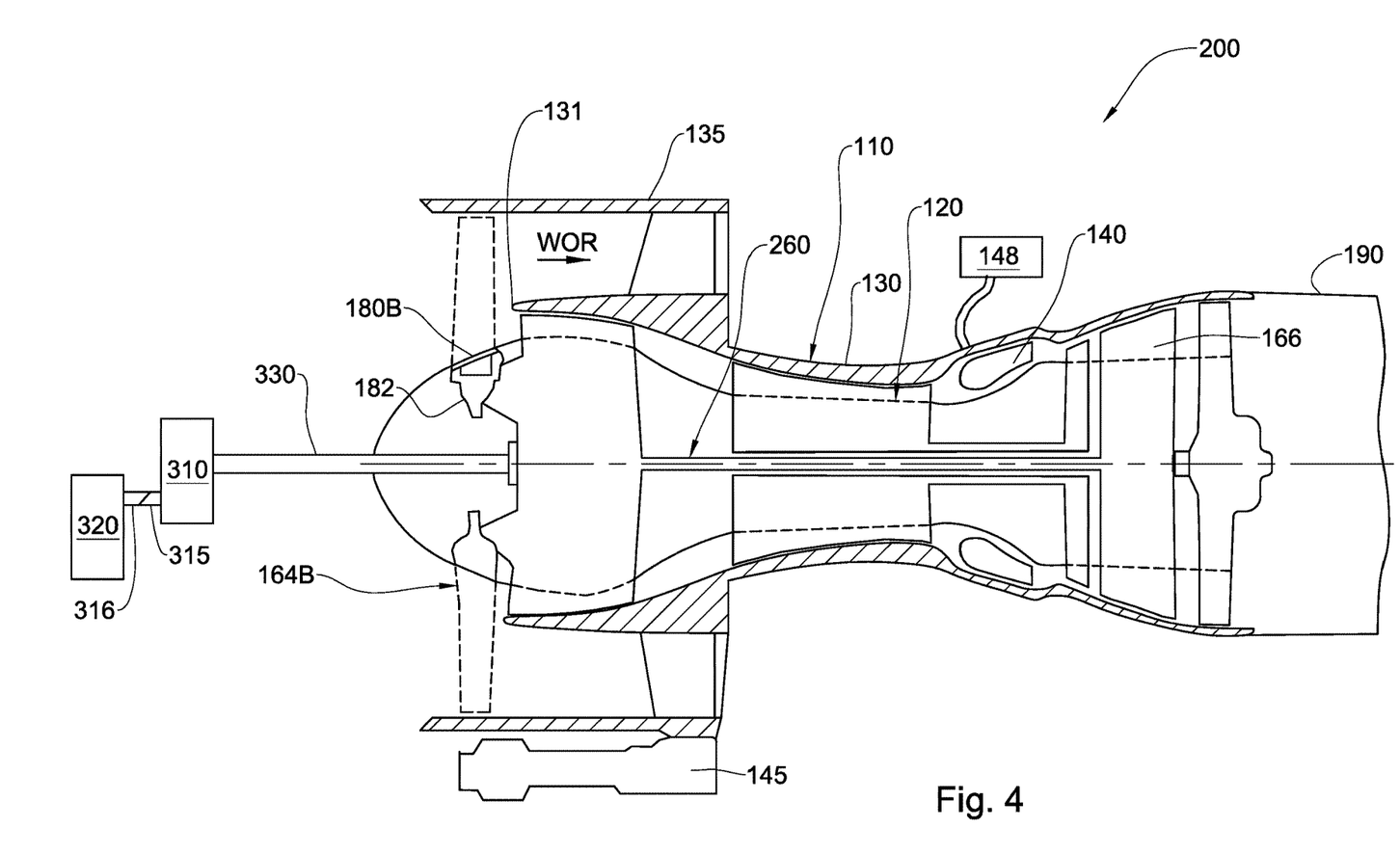
FIG. 4 schematically illustrates, in cross-sectional side view, a first example of a modified turbofan gas turbine engine, converted from the unmodified turbofan gas turbine engine example of FIG. 2, based on a second example of a modified fan.

In this example, the combustion chamber 140 is unchanged with respect to the unmodified turbofan gas turbine 100, and thus continues to work based on liquid fuel. However, on alternative variations of this or of other examples, or in other examples, the combustion chamber can be modified, or replaced, to enable combustion of gas fuels, or indeed of solid fuels. Referring to FIG. 4, in a second example of the modified fan, designated herein by the reference numeral 164B, replaces the modified fan 164A of the modified engine 200 of FIG. 3, mutatis mutandis.

The modified fan 164B has the fan blades 180 removed, optionally retaining the fan disc 182. Further optionally, plugs 180B can be provided to cover the openings left in the periphery of the fan disc 182, for example such openings corresponding to the fir tree root design of conventional fan blades. In this example, the absence of the fan blades 180 provides a slightly reduced core airflow WIR as compared with the core airflow WI of the unmodified turbofan engine 100, and correspondingly, the compression pressure ratio of the modified turbofan engine 200 is correspondingly less than that of the unmodified turbofan engine 100 (for the same set of engine operating conditions), lowering the available excess shaft power generated by the respective modified turbofan engine 200.

Thus, the unmodified fan 164 is configured for providing a first pressure ratio to a core flow that flows to the core engine; modifying or replacing the unmodified fan to provide modified fan 164B is such as to provide instead a second pressure ratio to the core flow to the core engine (thereby replacing the first pressure ratio), wherein the said second pressure ratio is effectively 1.0.

Figures 5, 5A:
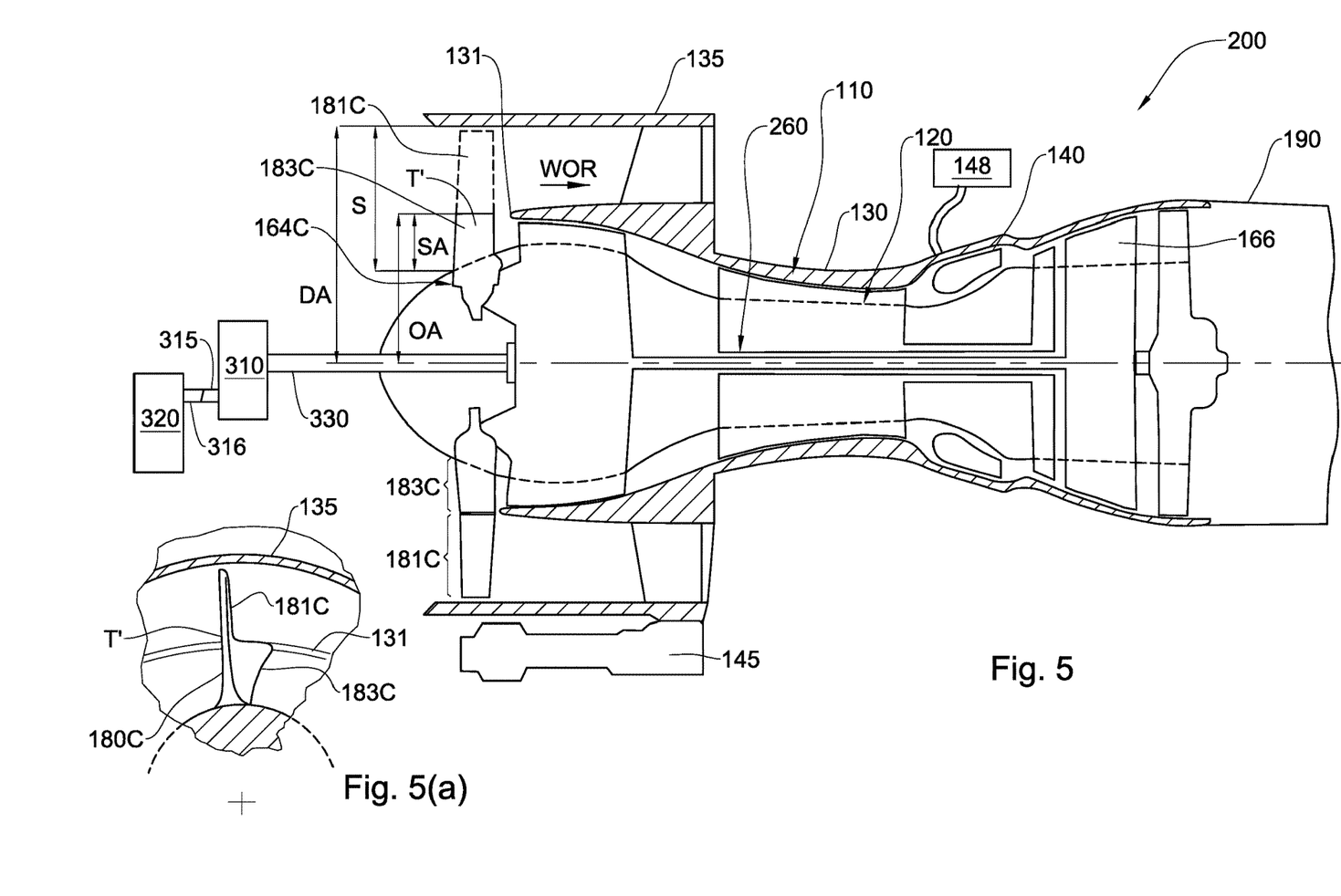
FIG. 5 schematically illustrates, in cross-sectional side view, a first example of a modified turbofan gas turbine engine, converted from the unmodified turbofan gas turbine engine example of FIG. 2, based on a third example of a modified fan.
FIG. 5(a) schematically illustrates, in front partial longitudinal cross-sectional view, the example of FIG. 5.

Referring to FIG. 5, in a third example of the modified fan, designated herein by the reference numeral 164C, replaces the modified fan 164A of the modified engine 200 of FIG. 3, mutatis mutandis.

The modified fan 164C comprises modified fan blades 180C, in which an outer radial portion 181C of the fan blades 180C generates reduced thrust and reduced bypass airflow, as compared with the unmodified fan blades 180 of the unmodified turbofan engine 100. Referring also to FIG. 5(a), outer radial portion 181C of each fan blade 180C has a zero or near zero angle of attack with respect to a direction of the airflow into the converted turbofan engine 200. The inner radial portion 183C of each blade 180C has a geometry similar to that of the corresponding portion of the unmodified fan blades 180, having the appropriate corresponding angle of attack. In this example, the original fan blades 180 are worked on to mechanically twist the radially outer portion 181C of the fan blades 180 in the appropriate direction, to provide the required modified blade geometry of fan blades 180C. Thus, the radial portion 181C of each fan blade 180C of the modified fan 164C does not provide a significant bypass airflow or bypass thrust. Alternatively rather than modifying the existing fan blades 180, these can be removed and replaced with new modified fan blades 180C, or the whole fan 180 can be replaced with a new fan having modified fan blades 180C.

In this example, the radial position of the transition T' between the outer radial portion 181C and the inner radial portion 183C of the modified fan blades 180C corresponds to the radial position of the leading edge 131 of casing 130, or just beyond. In this manner, the core airflow WI can remain relatively unaffected by the above modification of the fan, thereby ensuring that the compression pressure ratio of the core airflow into the core engine 110 remains essentially the same as in the unmodified turbofan engine 100 (for the same set of engine conditions, i.e., for the same set of operating conditions). In alternative variations of this example, the radial position of the transition T' of the modified fan blades 180C do not extend radially to the radial position of the leading edge 131 of casing 130, but instead are located at a radial position inwards of that of the leading edge 131, including a position up to the respective fan blade roots.

Figure 6:
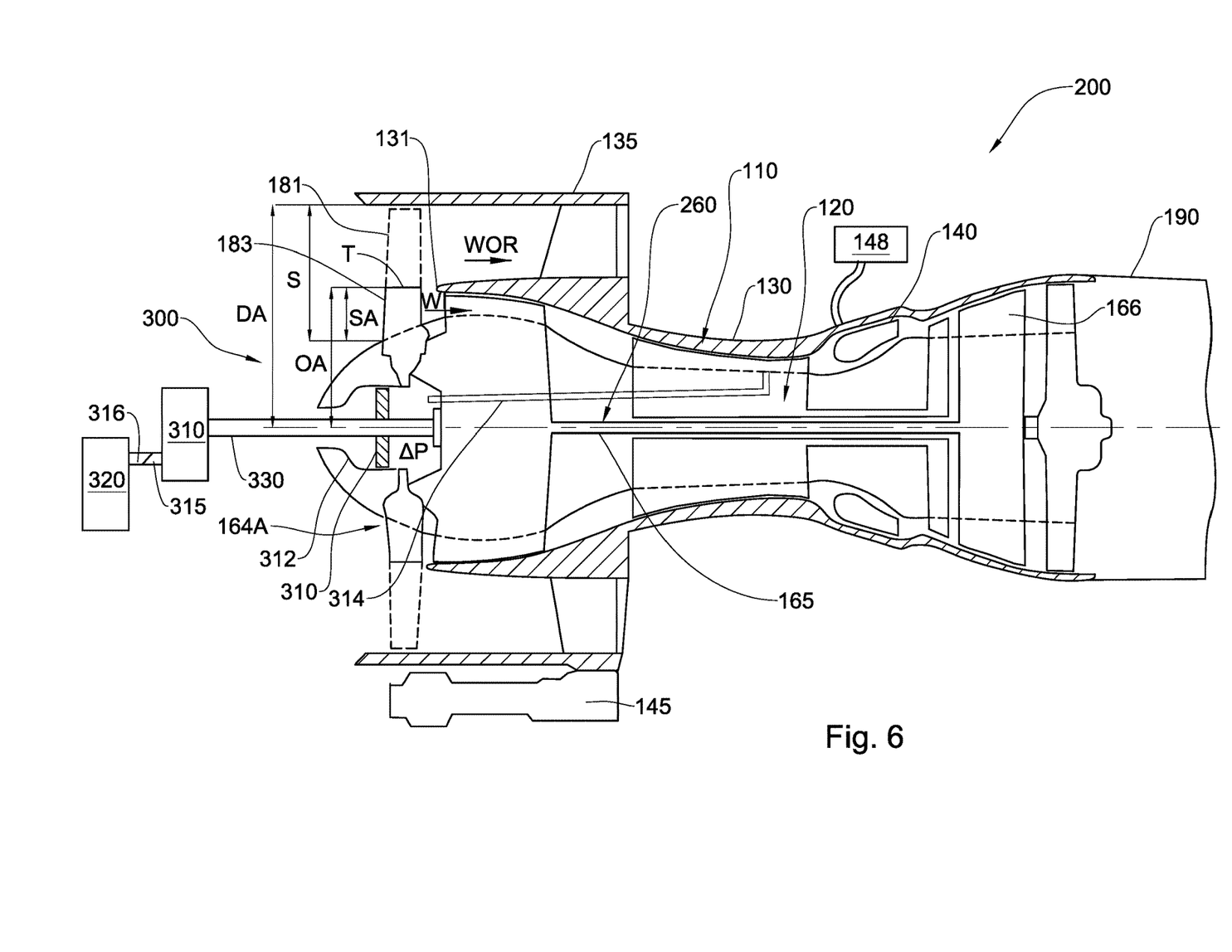
FIG. 6 schematically illustrates, in cross-sectional side view, an alternative variation of the example of FIG. 3, including an example of a thrust balancing arrangement.

It is to be noted that the aforementioned reduction in bypass flow typically provides also a reduction of bypass thrust, which can result in a net axial force being applied to low pressure spool assembly 160 in an aft direction. In some cases, the low pressure spool assembly 160 is already configured for operating under such circumstances; in other cases, it can be possible to modify the bearings of the low pressure spool assembly 160 to withstand the new loads arising from the net axial force being applied to low pressure spool assembly 160. In a variation of the example in FIG. 3, and in at least some other examples (for example, the examples illustrated in FIGS. 4 and 5, mutatis mutandis), the modified turbofan gas turbine 200 (including the modified fan according to any one of the first to third examples herein or alternative variations thereof or other examples thereof according to the presently disclosed subject matter) can be further modified by providing a suitable thrust balancing arrangement for providing thrust load compensation to the bearings of the low pressure spool assembly 160. For example, and referring to FIG. 6, such a thrust balancing arrangement can comprise a balance piston 300, comprising a piston head 310 fixed on the output shaft 330 to turn therewith with respect to a piston casing 312. The piston head 310 is thus mechanically connected to the inner shaft 165. One side of the piston is exposed to high pressure air, provided via a bleed line 314 in fluid communication with the high pressure compressor 120, while the other side of the piston head 310 is exposed to a different pressure, for example a lower pressure such as for example ambient air, to provide a pressure difference ΔP across the piston head. This arrangement results in providing a forward compensating force to the low pressure spool via the inner shaft 165, and by controlling the pressure difference ΔP across the piston head and the area over which this pressure difference acts, the resulting compensating force can be provided that balances the aforesaid net axial force, for example similar to the original force generated by the unmodified fan. Alternatively, the compensating force to the net axial force can be provided via a hydraulic piston arrangement, or via a mechanical piston arrangement, or any other suitable force compensating arrangement. Referring again to FIGS. 3, 4 and 5, for example, a diffuser 190 can optionally be provided aft of the low pressure turbine 166 to minimize the core thrust, or to reduce the core thrust close to zero. By doing so, more of the energy available in the hot gases can be extracted by the low power turbine 166, thereby increasing further the aforementioned excess shaft power.

Typically, the original engine pressure ratio of the turbofan engine is maintained in the modified turbofan engine. This can be useful in allowing the modified turbofan engine to operate in an optimum manner similar to the unmodified turbofan engine. In at least some examples, including one or more of the above examples, the original engine pressure ratio of the turbofan engine is maintained in the modified turbofan engine by modifying the low pressure turbine in the modified turbofan engine to provide a flow cross-sectional flow area through the low pressure turbine at an axial location thereof that is larger than the corresponding flow cross-sectional flow area in the unmodified turbofan engine. For example, the last stage of stators of the low pressure turbine can be modified to increase the flow area therethrough, for example by changing the pitch of the stators.

A man of ordinary skill in the art appreciates that the modified turbofan engine 200 needs to be suitably controlled to provide the desired performance, and some further adjustments of the modified engine 200 may also be necessary. For example, a series of tests and/or numerical simulations may be required to determine optimum operating conditions (i.e. optimum engine conditions), for example matching the high pressure spool with respect to the low pressure spool.

As will become clearer below, Step 930 comprises operatively connecting the converted turbofan engine to an electrical generator to enable conversion of said excess shaft power to electrical power. It is to be noted, though, that the excess shaft power can be used in a different manner, for example for driving a mechanical load.

Referring again to FIGS. 3, 4 and 5, an engine power output shaft 330 is coupled to, and is driven by, the low pressure spool 160. In this example, the engine power output shaft 330 is coupled to the low pressure spool 160 at the front end of the engine 200, thereby avoiding interaction or interference with the hot exhaust gases. In particular, the engine power output shaft 330 is coupled to the respective modified fan 164A, 164B, 164C, either directly or via a universal joint, or example. However, in alternative variations of this example, the engine power output shaft 330 can be coupled, instead, to the low pressure spool 160 at the aft end of the engine 200, for example by direct coupling to the low pressure turbine 166. In yet other alternative variations of this example, an additional engine power output shaft can be coupled to the low pressure spool 160 at the aft end of the engine 200, for example by direct coupling to the low pressure turbine 166, so that the modified turbofan engine 200 is coupled to two electrical generators, one via the low pressure turbine, and the other via the modified fan.

In turn, the engine power output shaft 330 is also coupled to a gearbox 310, while an output shaft 315 of the gearbox 310 is connected to the input shaft 316 of electrical generator 320. The electric generator 320 can include any one of a number of suitable electrical generators that generate electrical power, responsive to the input shaft 316 being mechanically turned. For example, the electrical generator can be of the permanent magnet type, and can be configured for providing single phase, or three-phase power at any desired voltage. Examples of suitable electrical generators can include: Sgen-100A 4p provided by Siemens (Germany); 6A8 Series provided by GE (USA). Examples of suitable gearboxes can include high speed single stage parallel shaft gearboxes, provided by Render Graffenstaden (EU) or by Elecon (India).

Thus, the converted turbofan engine 200 is configured for being operatively connected to an electrical generator 320 to enable conversion of said excess shaft power to electrical power. In at least one of the above examples in which the converted turbofan engine 200 is converted from a CFM 56-3 turbofan engine, it is contemplated that such a converted turbofan engine 200 can generate for example about 15 MW of electrical power.

For example, in theoretical studies conducted by the applicants, at continuous ISA conditions, the unmodified CFM 56-3 turbofan engine generates a net thrust of 21,995 lbf, with a thrust specific fuel consumption of 0.39. At the same conditions, including a fuel flow rate of 8686 lbm/hr, engine pressure ratio of 3.99, the modified turbofan engine (modified as per the example illustrated in FIG. 3) generates a shaft power of 15,551 kW, with shaft efficiency of 32.9%, a shaft heat rate of 10372 Btu/kWh and shaft efficiency of 0.42 lbm/hp·hr (concurrently, the modified turbofan engine generates a net thrust of 35301 bf).

Figure 7:
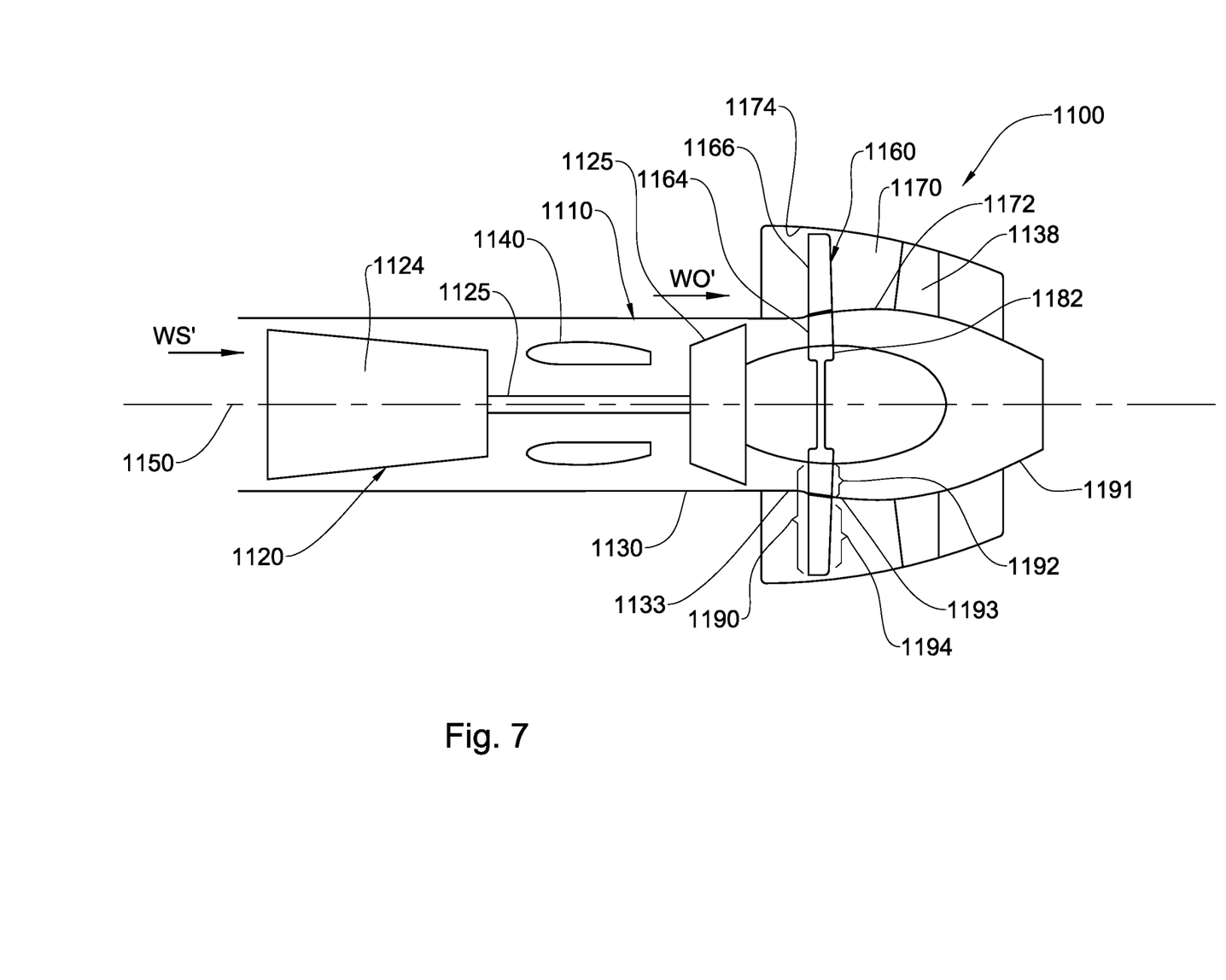
FIG. 7 schematically illustrates, in cross-sectional side view, a second example of an unmodified turbofan gas turbine engine.

Referring to FIG. 7, a second example of a turbofan engine, generally designated with reference numeral 1100, provided in Step 910, is a multi-spool, high bypass, aft fan, turbofan gas turbine engine. Turbofan engine 1100 is similar to turbofan engine 100, mutatis mutandis, but with some differences, as follows.

Turbofan engine 1100 comprises a core engine 1110, including casing 1130, a high pressure spool assembly 1120 (rotatable about longitudinal axis 1150, and comprising a high pressure compressor 1124 and a high pressure turbine 1126, axially spaced from one another by an outer shaft 1125), and combustion chamber 1140, similar to the corresponding components of turbofan engine 100, mutatis mutandis: core engine 110, casing 130, high pressure spool assembly 120 (longitudinal axis 150, high pressure compressor 124, high pressure turbine 126, outer shaft 125), and combustion chamber 140.

Turbofan engine 1100 also comprises a fan 1164 mechanically coupled to a low pressure turbine 1166 for rotation therewith. In this example, the fan 1164 is located at a aft portion of the turbofan engine 1100, aft of the core engine 1110, and this mechanical coupling is provided by having the fan 1164 and the low pressure turbine 1166 in a single rotor assembly 1160.

An annular bypass duct 1170 is provided, having an inner wall 1172 defined by an outer part of an aft casing 1133 that is joined to the casing 1130, aft of the high pressure turbine 1126, and having an outer wall 1174 defined by an inner part of bypass casing 1135. Bypass casing 1135 is in radially spaced relationship with respect to aft casing 1133 via radial struts 1138.

The rotor assembly 1160 comprises a rotor disc 1182, and a plurality of dual aerofoils 1190, mounted on the periphery of the rotor disc 1182 in circumferential spaced relationship, and radially projecting from the rotor disc 1182.

Each dual aerofoil 1190 comprises an inner turbine blade portion 1192 joined to an outer fan blade portion 1194 via platform 1193, and in this example, each dual aerofoil 1190 is formed as an integral structure. The respective inner turbine blade portions 1192 form the low pressure turbine 166, while the outer fan blade portions 194 form the fan 1166. The platforms 1193 join one another to form an annular ring that rotatably seals with respect to the aft casing 1133. Thus, the fan 1164 is accommodated in the bypass casing 1135, while the low pressure turbine 1164 is accommodated in the aft casing 1133.

The rotor assembly 1160 is in coaxial relationship with shaft 1125 and turns independently thereof about longitudinal axis 1150.

A nozzle 1191 is provided aft of aft casing 1133.

In conventional operation of the turbofan engine 1100, an inner airflow WI' is induced into the core engine 1110, and a bypass airflow WO' is induced into the bypass duct 1170.

In this example, the bypass ratio, defined as the mass flow rate ratio between the bypass airflow WO' and inner airflow WI', is in the order of 5:1, for example 5:1. However, in the above or other alternative variations of this example, or in the above or other alternative examples, the respective bypass ratio can be less than 5:1 or greater than 5:1.

The inner airflow WI' is compressed by the high pressure compressor 1124, and fed to the combustion chamber 1140, wherein fuel, provided by the fuel system (not shown), is also fed and burnt, generating hot exhaust gases. These exhaust gasses pass through and drive the high pressure turbine 1126 and then the low pressure turbine 1166. In aeronautical applications, nozzle 1191 accelerates the hot exhaust gases and providing a core thrust.

The bypass airflow WO' flows exclusively through the bypass duct 1170, completely bypassing the core engine 1110, and providing in aeronautical applications a fan bypass thrust.

Thus, the core engine 1110 is designed to generate hot exhaust gases capable of driving the high pressure turbine 1126, the low pressure turbine 1166, and having sufficient energy to provide the required core thrust. In turn, the high pressure turbine 1126 is designed to generate sufficient power to drive the high pressure compressor 1124, while the low pressure turbine 1166 is designed to generate sufficient power to drive the low pressure compressor fan 1164, and thus to provide the required fan bypass thrust.

As will become clearer below, in the second example Step 920 comprises providing a converted turbofan engine from the turbofan engine 1100, by modifying or replacing the original unmodified fan 1164 to provide a modified fan that is now configured for reducing bypass fan thrust/bypass airflow generated by the fan during operation of the engine (as compared with the bypass fan thrust/bypass airflow generated with the unmodified fan in the original turbofan engine), to allow the low pressure turbine to generate an excess shaft power above a baseline shaft power that is required for driving said modified fan during operation of the converted turbofan engine.

Figure 8:
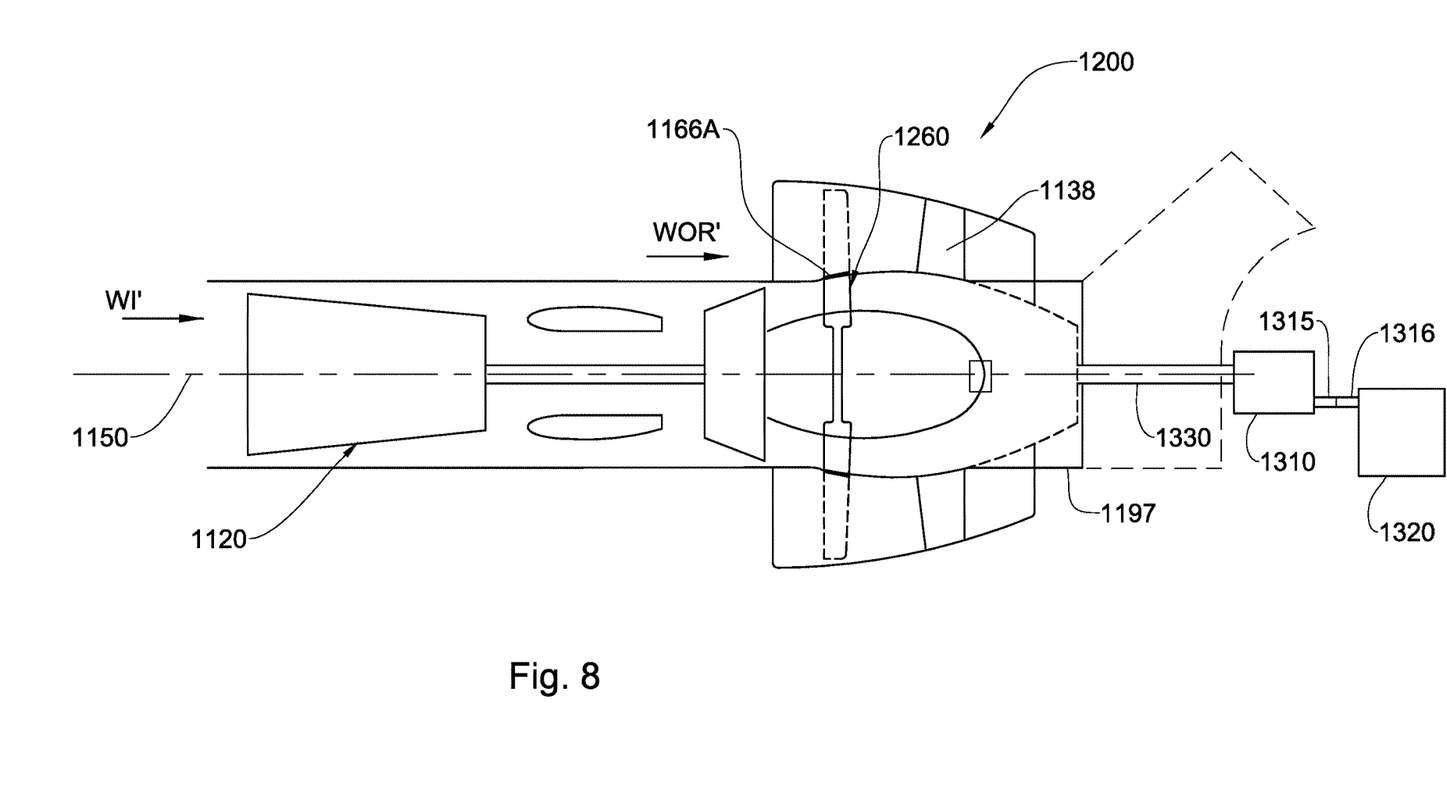
FIG. 8 schematically illustrates, in cross-sectional side view, a second example of a modified turbofan gas turbine engine, converted from the unmodified turbofan gas turbine engine example of FIG. 7.

Referring also to FIG. 8, the turbofan engine 1100 is converted to a modified or converted turbofan 1200, comprising, i.e., retaining, the core engine 1110, including the high pressure spool assembly 1120 and the combustion chamber 1140, and also comprising, i.e., retaining, the low pressure turbine 1166. As is clear from the presently disclosed subject matter, the low pressure turbine 1166 is initially designed to drive the unmodified fan 1164, the unmodified fan 1164 being configured for providing at least a bypass airflow bypassing the core engine to generate a fan bypass thrust when driven by said low pressure turbine. (In this example the unmodified fan 1164 is also configured for providing only the bypass flow and does not contribute to the core airflow through the core engine 1110.)

However, in this example of the converted or modified turbofan engine 1200, the original or unmodified fan 1164 is essentially removed by removing part or all of each of the outer fan blade portion 1194 of the dual aerofoils 1190, preferably up to but not including the respective platforms 1193, though in alternative variations of this example part of the respective outer fan blade portion 1194 can be retained. The result is to have the original or unmodified fan 1164 modified to, or replaced by, what is conveniently referred to herein as a "modified fan", and designated with the reference numeral 1166A, even though such a "modified fan" can have no fan blades at all, or very short fan blades. Such a "modified fan" 1166A, which in this example can comprise only the outer parts of the platforms 1193 when all the fan blade portions 1194 are removed, is coupled to the low pressure turbine 1166 via the correspondingly modified single rotor assembly 1260, in a similar manner to the coupling of the unmodified fan 1164 to the low pressure turbine 1166 via the unmodified rotor assembly 1160 as disclosed herein, mutatis mutandis.

Similarly, in the modified turbofan engine 1200, the low pressure turbine 1166 is driven by hot gases generated by the core engine 1110, thereby turning the modified fan 1166A.

The modified fan is configured for generating a reduced or zero bypass fan thrust and/or modified bypass airflow during operation of the modified bypass engine 1200, as compared with the bypass fan thrust and/or bypass airflow, respectively, generated by the unmodified fan (at similar engine operating conditions). Thereby, the low pressure turbine 1166 generates an excess shaft power above a baseline shaft power that is required only for driving said modified fan during operation of the converted turbofan engine 200. In the above example where no bypass airflow is generated, the baseline shaft power is at a minimum, and the excess shaft power can be maximized.

It is to be noted that the aforementioned excess shaft power can result in a net axial force being applied to rotor assembly 1160. Accordingly, the modified turbofan gas turbine 1200 can be further modified by providing a suitable arrangement for providing thrust load compensation to the bearings of the rotor assembly 1160, for example a balance piston as disclosed above, mutatis mutandis.

Referring again to FIG. 8, a diffuser 1197 can be provided aft of the low pressure turbine 1166 to replace the nozzle 1191, and thus minimize the core thrust, or reduce the core thrust to zero. By doing so, more of the energy available in the hot gases can be extracted by the low power turbine 1166, thereby increasing further the aforementioned excess shaft power.

In this example, Step 930 comprises operatively connecting the converted turbofan engine to an electrical generator to enable conversion of said excess shaft power to electrical power. It is to be noted, though, that the excess shaft power can be used in a different manner, for example for driving a mechanical load.

Referring again to FIG. 8, an engine power output shaft 1330 is coupled to, and is driven by, the rotor assembly 1160. In this example, the engine power output shaft 1330 is coupled to the low pressure spool 160 at the aft end of the engine 1200, and a suitable diverter duct 1199 can be provided aft of the diffuser 1197 to divert the hot gases away from the aft end of the output shaft 1330. In particular, the engine power output shaft 1330 is coupled to the rotor assembly 1160, either directly or via a universal joint, or example. In turn, the engine power output shaft 1330 is also coupled to a gearbox 1310, while an output shaft 1315 of the gearbox 1310 is connected to the input shaft 1316 of electrical generator 1320. The electric generator 1320 can include any one of a number of suitable electrical generators that generate electrical power, responsive to the input shaft 1316 being mechanically turned, for example as disclosed above for the first example, mutatis mutandis.

Thus, the converted turbofan engine 1200 is configured for being operatively connected to an electrical generator 1320 to enable conversion of said excess shaft power to electrical power.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:
1. A turbofan engine, comprising;
a core engine including at least one high pressure spool assembly and a combustion chamber;
a modified fan retrofittably mechanically coupled to a low pressure turbine that is in turn driven by hot gases generated by the core engine; wherein said modified fan is derived from or replaces an unmodified fan;
wherein said modified fan is configured for generating a reduced bypass flow during operation of the turbofan engine relative to the unmodified fan, effective for said low pressure turbine to generate an excess shaft power above a baseline power required for driving said modified fan during operation of the turbofan engine;
wherein the modified fan comprises a plurality of modified fan blades, wherein each said modified fan blade of said plurality of modified fan blades of the modified fan includes a corresponding inner blade portion having an inner radial portion geometry and an angle of attack;
wherein said inner blade portion of each fan blade of the modified fan radially extends from a respective blade root to a radial position corresponding to the radial position of a leading edge of a casing of the core engine; and
wherein a respective blade tip of each of said plurality of modified fan blades of the modified fan is located at the respective radial position.

2. The turbofan engine according to claim 1, wherein said modified fan is configured to produce a reduced bypass thrust, as compared with the bypass thrust generated by the unmodified fan when coupled to the turbofan engine in place of the modified fan.

3. The turbofan engine according to claim 1, wherein said modified fan and said low pressure turbine are provided in a low pressure spool assembly.

4. The turbofan engine according to claim 1, wherein the turbofan engine is configured for being operatively coupled to an electrical generator to enable conversion of said excess shaft power to electrical power.

5. The turbofan engine according to claim 4, wherein the turbofan engine is selectively coupled to the electrical generator via the modified fan.

6. The turbofan engine according to claim 4, wherein the turbofan engine is selectively coupled to the electrical generator via the low pressure turbine.

7. The turbofan engine according to claim 1, wherein said turbofan engine is a multi-spool, high bypass, forward fan, turbofan gas turbine engine, wherein the modified fan is forward mounted with respect to the core engine.

8. The turbofan engine according to claim 1, wherein said turbofan engine is a multi-spool, high bypass, aft fan, turbofan gas turbine engine, wherein the modified fan is aft-mounted with respect to the core engine.

9. The turbofan engine according to claim 1, wherein said modified fan and said low pressure turbine are provided in a single rotor assembly.

10. The turbofan engine according to claim 1, further comprising a thrust bearing arrangement for the low pressure turbine for balancing a next axial force corresponding to said excess shaft power.

11. The turbofan engine according to claim 1, wherein the low pressure turbine in the turbofan engine is configured to provide a flow cross-sectional flow area through the low pressure turbine of the turbofan at an axial location thereof.

12. A turbofan engine, comprising:
a core engine including at least one high pressure spool assembly and a combustion chamber;
a modified fan retrofittably mechanically coupled to a low pressure turbine that is in turn driven by hot gases generated by the core engine;
wherein said modified fan is derived from or replaces an unmodified fan;
wherein said modified fan is configured for generating a reduced bypass flow during operation of the turbofan engine relative to the unmodified fan, effective for said low pressure turbine to generate an excess shaft power above a baseline power required for driving said modified fan during operation of the turbofan engine;
wherein the modified fan comprises a plurality of modified fan blades, wherein each said modified fan blade of said plurality of modified fan blades of the modified fan includes a corresponding inner blade portion having an inner radial portion geometry and an angle of attack;
wherein said inner blade portion of each fan blade of the modified fan radially extends from a respective blade root to a radial position corresponding to the radial position of a leading edge of a casing of the core engine; and
wherein at least an outer radial portion of the fan blades is absent from the modified fan.

13. A turbofan engine, comprising:
a core engine including at least one high pressure spool assembly and a combustion chamber;
a modified fan retrofittably mechanically coupled to a low pressure turbine that is in turn driven by hot gases generated by the core engine; wherein said modified fan is derived from or replaces an unmodified fan;
wherein said modified fan is configured for generating a reduced bypass flow during operation of the turbofan engine relative to the unmodified fan, effective for said low pressure turbine to generate an excess shaft power above a baseline power required for driving said modified fan during operation of the turbofan engine;
wherein the modified fan comprises a plurality of modified fan blades, wherein each said modified fan blade of said plurality of modified fan blades of the modified fan includes a corresponding inner blade portion having an inner radial portion geometry and an angle of attack;
wherein said inner blade portion of each fan blade of the modified fan radially extends from a respective blade root to a radial position corresponding to the radial position of a leading edge of a casing of the core engine; and
wherein said inner blade portion of each fan blade of the modified fan includes a respective modified blade tip radially spaced from a respective blade root by said radial position.

14. A turbofan engine, comprising:
a core engine including at least one high pressure spool assembly and a combustion chamber;
a modified fan retrofittably mechanically coupled to a low pressure turbine that is in turn driven by hot gases generated by the core engine; wherein said modified fan is derived from or replaces an unmodified fan;
wherein said modified fan is configured for generating a reduced bypass flow during operation of the turbofan engine relative to the unmodified fan, effective for said low pressure turbine to generate an excess shaft power above a baseline power required for driving said modified fan during operation of the turbofan engine;
wherein the modified fan comprises a plurality of modified fan blades, wherein each said modified fan blade of said plurality of modified fan blades of the modified fan includes a corresponding inner blade portion having an inner radial portion geometry and an angle of attack;
wherein said inner blade portion of each fan blade of the modified fan radially extends from a respective blade root to a radial position corresponding to the radial position of a leading edge of a casing of the core engine; and
an exhaust diffuser fitted to the core engine, wherein the exhaust diffuser is configured for reducing a core engine thrust.

* * * * *